Figure 1:
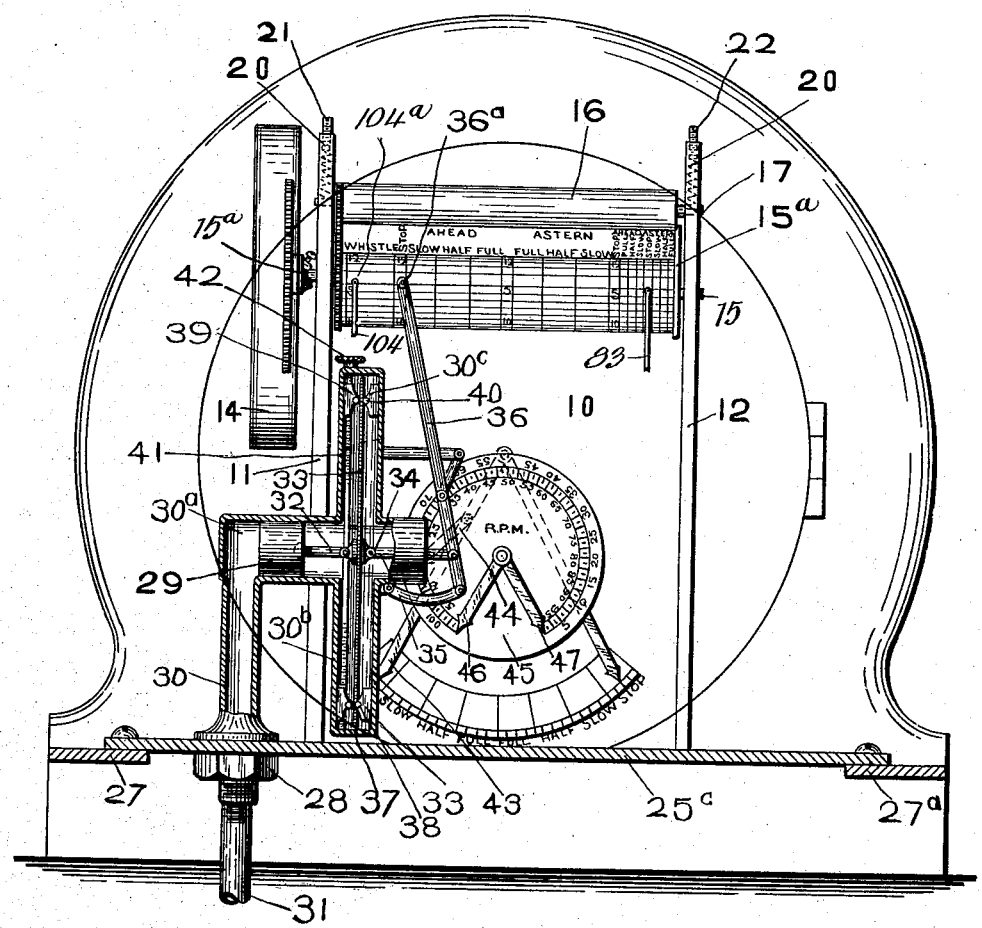

E. A. FISH.
SHIP'S INDICATOR.
APPLICATION FILED JULY 14, 1913.

1,145,884.

Patented July 13, 1915.
3 SHEETS—SHEET 1.

WITNESSES:

INVENTOR
Edwin A. Fish,
BY
Frank H. Allen
ATTORNEY

E. A. FISH.
SHIP'S INDICATOR.
APPLICATION FILED JULY 14, 1913.
1,145,884.
Patented July 13, 1915.
3 SHEETS—SHEET 2.
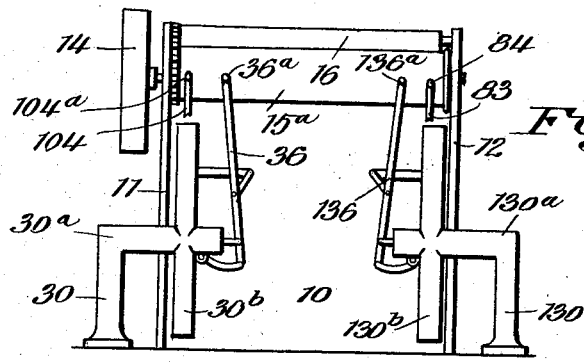
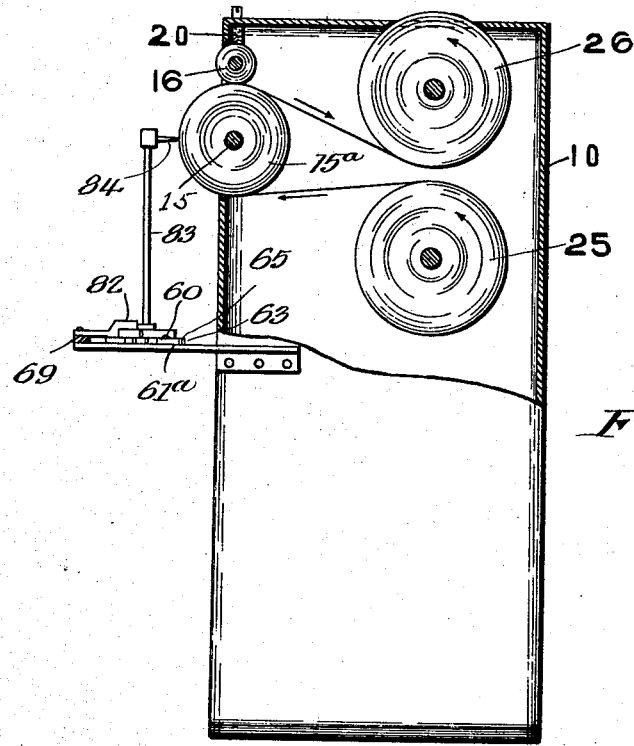
WITNESSES:
W. J. Baldwin
Elsie P. Grunert
INVENTOR
Edwin A. Fish,
BY
Frank H. Allen
ATTORNEY

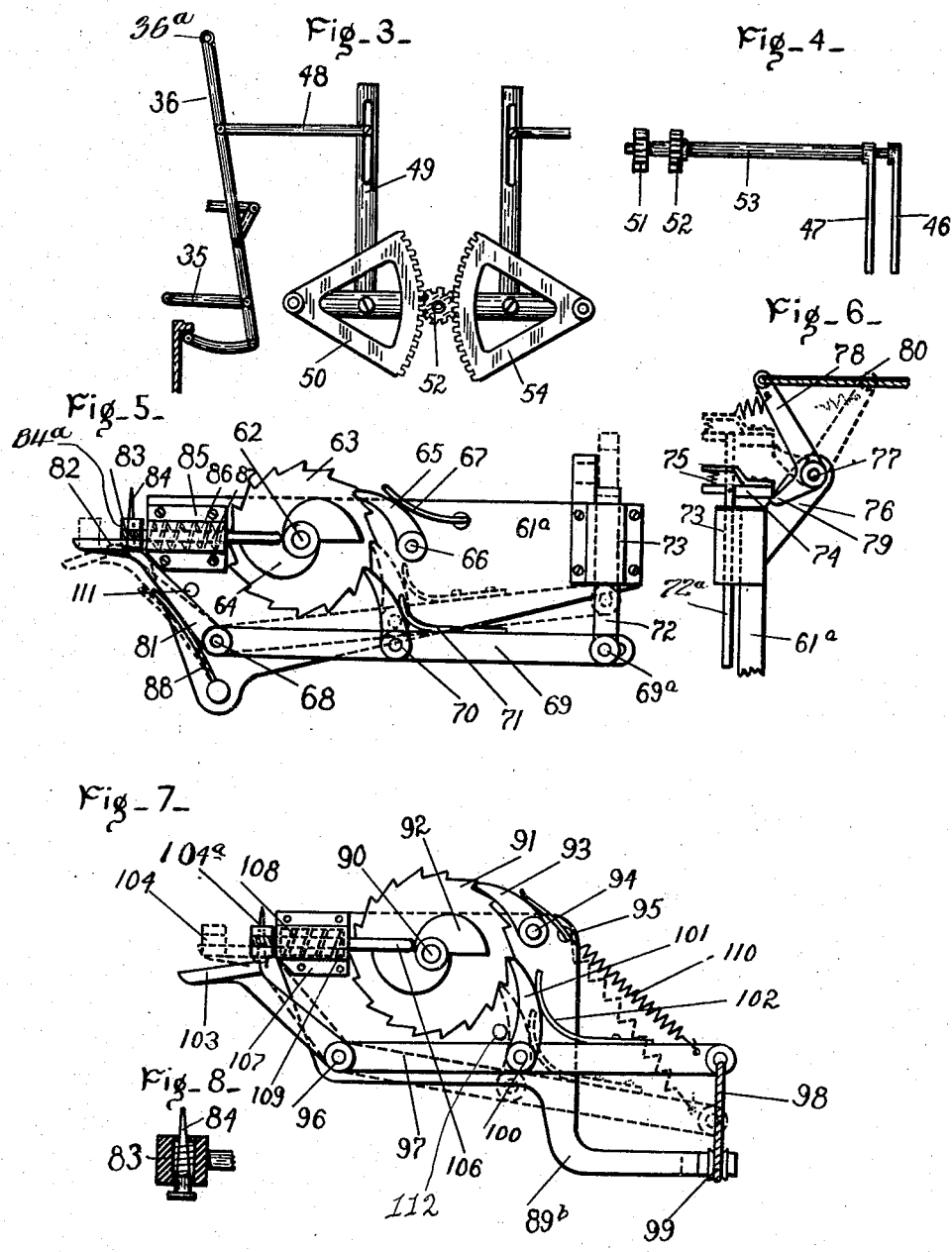

UNITED STATES PATENT OFFICE.

EDWIN A. FISH, OF NEW LONDON, CONNECTICUT, ASSIGNOR, BY MESNE ASSIGNMENTS, TO FISH AUTOMATIC SHIP'S LOG CO., A CORPORATION OF NEW YORK.

SHIP'S INDICATOR.

1,145,884. Specification of Letters Patent. Patented July 13, 1915.

Application filed July 14, 1913. Serial No. 779,072.

*To all whom it may concern:*

Be it known that I, EDWIN A. FISH, a citizen of the United States, residing at New London, in the county of New London and State of Connecticut, have made certain new and useful Improvements in Ships' Indicators, of which the following is a specification, reference being had to the accompanying drawings.

The object of this invention is to provide mechanism by means of which the movement of a ship's engine will be automatically and accurately indicated and recorded, as well as all signals that pass between the pilot house and the engine room; thus providing an indisputable record which may be referred to, and relied upon, in the event of subsequent disagreements or misunderstandings as to such signals, etc.

My present improvements are illustrated in the annexed drawings, Figure 1 being a front elevation of the same with the housing partly broken away to disclose portions of the interior mechanism, and Fig. 2 is a side elevation of the said indicator and recorder also partially broken away to disclose particularly the paper-controlling devices. Fig. 3 is a detached, front face, view of the mechanism which controls the movements of the "revolutions-per-minute" indicators and in Fig. 4 I have illustrated, in side elevation, the pointers used to indicate the said "revolutions-per-minute" and also manner of mounting said pointers. Fig. 5 is a plan view of the mechanism employed in connection with the bell-recording devices; that is to say, the mechanism which makes a permanent record of each bell signal sent from the pilot house to the engine room. Fig. 6 is an end elevation of certain other members of the said bell-recording devices. Fig. 7 is a plan view of mechanism specially provided for recording each whistle signal. Fig. 8 is an enlarged detail of one of the punching styluses. Fig. 9 is a diagrammatic view on a smaller scale than Fig. 1, of the complete device.

For the purpose of rendering the drawings less confusing, certain detail mechanisms, to wit, the bell and the whistle-recording mechanism, are not shown in Figs. 1 and 2, said mechanisms, however, except diagrammatically in the latter, being illustrated on an enlarged scale and with particularity, in the Figs. 5, 6 and 7 already referred to.

As my invention consists of a number of units, each complete in itself, although all possessing certain inter-dependent functions, I will describe their constructions and operations *seriatim*, in order that the working of my device as a whole, may be best understood.

I will take up first the paper-controlling unit. The numeral 10 represents a back plate upon which the several units are mounted. Secured to this plate are two vertical side-plates 11 and 12 and secured to the side plate 11, is a clock movement 14 which has a winding arbor 15, said arbor extending through said movement 14 and supporting a tympan roll 15$^a$ concentric therewith; the end of the arbor being supported in a bearing in the side plate 12. This tympan roll is caused to rotate at a constant, predetermined, speed by the above mentioned clock movement. Parallel with said roll 15$^a$, and tangent thereto, is a tension roll 16 mounted on an arbor 17, which is constrained to move vertically by two slots in the side plates 11 and 12 respectively, in which the arbor 17 is mounted. The arbor 17 is forced downward by compression springs 20, these springs being retained in position by caps 21 and 22. Turning in bearings in the side plates 11 and 12 is a let-off roll 25 which carries a ribbon of paper, and a take-up roll 26. Said roll 25 turns freely, while the roll 26 is provided with any suitable friction drive (not shown), which tends to impart to the said roll a surface speed slightly greater than that of the tympan roll 15. By means of the above described construction, the record paper, after leaving the let-off roll 25, will be held tightly against the surface of the tympan roll throughout its arc of contact.

I will now describe the construction of the engine recording units. There are two of these, identical in construction and operation, one being active when the engine is turning ahead, and the other when the engine is turning astern.

Fig. 9 shows diagrammatically a device embodying means for indicating speed both ahead and astern. The operation of both is the same and it is, therefore, deemed necessary to describe but one.

Parallel with the base of the casing is a horizontal plate 25ª which is mounted on two supporting plates 27 and 27ª. Secured to the plate 25ª by means of a nut 28 is the member 30 which is connected with the steam supply by a pipe 31. This member 30 extends upwardly and is then formed into a horizontal cylinder 30ª which in turn is extended into vertical casings 30ᵇ and 30ᶜ. Suitably fitted in the cylinder 30ª is the piston 29 having a piston rod 32 which is connected to a vertical, flexible member 33. On said member 33 is a link 35 pivoted at 34 which connects with an arm 36 which is supported by a parallel motion of the well known type used in ordinary steam indicators, by means of which a stylus 36ª mounted at the extremity of the arm 36 is caused to move in a line parallel with the axis of the tympan cylinder and tangent to the periphery of the same. The member 33 is retained in position laterally by four fulcrums 37, 38, 39 and 40 which are adapted to adjust vertically by means of a right and left hand screw 41 controlled by a thumb screw 42. The indicator arm 43 which is located in the rear of the R. P. M. dial is connected with the member 35 by a backwardly offset link 44. By this construction it will be seen that when steam is admitted through the pipe 31 against the piston 29 the member 44 will be caused to move across the graduated scale located beneath it whereby the speed of the engine can be readily seen at a glance. Central with another dial 45 are two indicators 46 and 47. By referring to the Figs. 3 and 4 the operation of these can be readily understood. By a link 48 an arm 49 is connected with the above mentioned arm 36. This actuates a quadrant 50 which meshes with the pinion 51 which in turn actuates the pointer 46. In front of the pinion 51 is a pinion 52 mounted on a sleeve 53 which actuates the pointer 47 and the pinion 52 is actuated by a corresponding quadrant 54 which is actuated by the corresponding astern mechanism which has been mentioned above, see Fig. 4.

At the opposite side of the machine is the mechanism for controlling the astern indicating and recording devices, which devices are identical in construction and operation with the ahead indicating and recording devices, as will be readily understood upon reference to Fig. 9, in which 130 is a duplicate of the part 30 in Fig. 1, 130ª, 130ᵇ, 136 and 136ª are parts corresponding to those on Fig. 1 indicated respectively by the reference characters 30ª, 30ᵇ, 36 and 36ª.

The device is adjusted by the mechanism above described in accordance with the pressure of steam in the engine. For instance, if the engine employed is operating under 150 pounds of steam, the mechanism is so adjusted by manipulation of the screw 41 that the stylus 36ª will be moved correspondingly.

I will now describe the bell recording unit. In this mechanism the stylus is not permanently in contact with the record paper, as it is in the case of the engine and telegraph recording mechanisms already described but it makes a puncture in the record paper whenever the bell is pulled. It will readily be seen that should several bell pulls be made in rapid succession, the record paper would not have time to move an appreciable distance and the punctures made by the stylus would be superimposed, one upon another, were not some mechanism provided whereby the stylus is moved laterally a short distance each time the bell is pulled. The complete mechanism for producing these results, (that is for puncturing the record paper, and moving the stylus laterally) is as follows:—Secured to the back plate 10 is a bracket 61, one extremity of which is formed into a shelf or pad 61ª, integral with which is a stud 62, on which is mounted a ratchet wheel 63 and integral with said ratchet wheel is a double equal-rise side cam 64. Coöperating with said wheel is a holding pawl 65, mounted on a stud 66 and held in engagement with said wheel by a spring 67. Integral with said pad 61ª is a stud 68, on which is mounted a lever 69, on which is mounted a driving pawl 70, held in engagement with wheel 63 by a spring 71. Pivoted in a slot 69ª in said lever 69, is an arm 72, of rectangular cross section which is retained in position by a guide 73 and extending downwardly from said arm 72 and free to move slightly in a clockwise direction, is a lug 74, normally held vertical by a relief spring 75 (see Fig. 6). Integral with the pad 61ª is an arm 76, having a stud 77, on which is mounted a bell crank 78, having one arm extended into a contact teat 79. Attached to the other extremity of said bell crank is a flexible connector 80. The lever 69 is extended into an arm 81, terminating in a contact shoe 82, adapted to engage with a flexible finger 83, carrying a stylus 84, adapted to puncture the record paper. The finger 83 is mounted on a rod 84ª of rectangular cross section, which is retained in alinement by a guide 85. The other extremity of the rod 84ª is rounded and is tangent to the cam 64, and is retained thereagainst by a compression spring 86, one end of which abuts the guide 85, and the other end abuts a collar 87, pinned to the rod 84ª. A leaf spring 88 serves to retain the lever 69 in the position illustrated by the full lines in Fig. 7. In operation, the connector 80 is pulled, causing the bell crank 78 to assume the dotted position (see Fig. 6). During this movement the teat 79 wipes against the lug 74 and carries it laterally to the dotted position. This illustrates the critical position of the mechanism. Further movement of the bell crank will release the lug 74, when the spring 88 will cause the lever 69 to assume the full line position with a free movement, which will allow the shoe 82 to contact with the finger 83, thereby causing the stylus 84, carried by the same, to puncture the record paper. But, as the lever 69 moved from the full line to the dotted position, the driving pawl 70 fed the ratchet wheel 63 one tooth in a counter-clock-wise direction carrying with it the cam 64, whereby the finger-carrying rod 84$^a$ is moved laterally an appreciable distance, and hence a superimposition of record paper punctures is avoided. The dotted position of the finger 83 illustrates the extreme position of the rod 63, when the cam 64 has turned through an arc of 180°.

I will now describe the whistle recording mechanism. The bracket 89 is secured to the back plate 10 and at its extremity is formed into a pad or shelf 89$^a$. Integral with this is a stud 90, on which is mounted a ratchet wheel 91, integral with which is an equal-rise side cam 92. Coöperating with this cam is a holding pawl 93 mounted on a stud 94 which is integral with the pad 39$^a$. This pawl is retained in position by a spring 95, to one extremity of which is attached some fixed part. The pad 89$^a$ is extended into an arm 89$^b$, on the end of which is mounted a pulley 99, over which the flexible connector 98 is led. Pivoted to the lever 97 at 100 is a driving pawl 101, which is retained in position by a spring 102. The other extremity of the lever 97 is extended into a shoe 103 which is adapted to contact with a flexible finger 104 carrying at its upper extremity a stylus 104$^a$. The finger 104 is mounted on a rod 106, of rectangular cross-section, retained in alinement by a guide 107. The inner end of said rod is rounded, and is tangent to the cam 92 and it is retained in contact therewith by a compression spring 108 located in the guide 107, against which one end of the spring 108 abuts, while the other end of the spring abuts a collar 109 pinned to the rod 106. The lever 97 is retained in the full line position by the tension spring 110. In operation, the connector 98 is pulled, causing the lever 97 to assume the dotted position and bringing the shoe 103 in contact with the finger 104, thereby forcing the stylus 105 into contact with the record paper, and retaining it there until the connector 98 is released, when the spring 110 returns the lever 97 to the full line position. As the lever 97 assumes the dot and dash position, the driving pawl 101 is fed ahead one notch and during the return movement of the lever 97 the ratchet wheel 91 is turned one notch in a counter-clock-wise direction, thereby moving the finger 104 an appreciable distance laterally, thus avoiding superimposition of contact lines on the record paper. The dotted position of the finger 104 illustrates the extreme lateral movement, reached when the cam 92 has turned through an arc of 180°.

A stop pin 111, integral with pad 61$^a$, limits the spring actuated movement of the lever 69, and a stop pin 112, integral with the pad 89$^a$, limits the spring-actuated movement of the lever 97. The various members mounted on pads 61$^a$, and 89$^a$, Figs. 5, 6 and 7, have been omitted in Figs. 1 and 2 for the sake of clearness, but their functions may be readily understood by the above description.

My described device provides means for visibly indicating as well as for permanently recording the movements of the engine and also makes permanent records of the bell and whistle signals, which are available for reference at any future time.

Having thus described my invention, I claim as new and wish to secure by Letters Patent:—

1. A ship's log and recorder including a platen roll, means for feeding paper over said roll with a predetermined movement, a stylus, a flexible member, a cylinder, and a steam actuated piston therein connected with said flexible member for flexing the same, and connections between said flexible member and stylus embodying an arm and connections whereby said stylus is caused to traverse the paper with a movement parallel with the axial center of the platen roll.

2. A ship's log and recorder including a platen roll, means for feeding paper over said roll with a predetermined movement, a stylus, a flexible member, steam-actuated means for flexing the same, connections between said flexible member and stylus, and means for adjusting said flexible member in accordance with steam pressure.

3. A ship's log and recorder including a platen roll, means for feeding paper over said roll with a predetermined movement, a stylus, a flexible member, steam-actuated means for flexing the same, connections between said flexible member and stylus embodying an arm and connections whereby said stylus is caused to traverse the paper with a movement parallel with the axial center of the platen roll, and means for adjusting said flexible member in accordance with steam pressure.

4. A ship's log and recorder including a platen roll, means for feeding paper over said roll with a predetermined movement, a stylus, a casing, a flexible member therein, means within said casing for retaining said member in position laterally, a cylinder, a steam actuated piston therein connected with said member, a pivotally mounted arm connected with said stylus to cause the latter to traverse the paper with a movement parallel to the axial center of the platen roll, and a link pivotally connecting said arm and flexible member.

5. A ship's log and recorder including a platen roll, means for feeding paper over said roll with a predetermined movement, a stylus, a casing, a flexible member therein, means within said casing for retaining said member in position laterally and forming fulcrums therefor, steam-actuated means connected with said member, a pivotally mounted arm connected with said stylus to cause the latter to traverse the paper with a movement parallel to the axial center of the platen roll, a link pivotally connecting said arm and flexible member, and means for adjusting the fulcrums of said member vertically.

6. A ship's log and recorder including a record paper, means for feeding the same with a predetermined movement, a stylus for coöperation with said paper, a vertically disposed flexible member, means connected with one side thereof for flexing the same, means connected with the other side thereof for movement therewith, means for adjusting said member in accordance with steam pressure, and a stylus arm connected therewith and pivotally connected to give said stylus a movement at right angles to the line of travel of said paper.

EDWIN A. FISH.

Witnesses:
WILLIAM J. BALDWIN,
ELSIE P. GRUNERT.

Copies of this patent may be obtained for five cents each, by addressing the "Commissioner of Patents, Washington, D. C."